United States Patent [19]

Davis

[11] 4,082,139
[45] Apr. 4, 1978

[54] REGENERATOR DRIVE ASSEMBLY

[75] Inventor: Leonard C. Davis, Indianapolis, Ind.

[73] Assignee: General Motors Corporation, Detroit, Mich.

[21] Appl. No.: 771,475

[22] Filed: Feb. 24, 1977

[51] Int. Cl.² .......................................... F28D 19/00
[52] U.S. Cl. ........................................ 165/8; 64/1 V; 64/27 B; 74/243 R; 74/243 PC; 267/136; 267/154
[58] Field of Search ................... 165/8; 64/1 V, 27 B; 74/243 R, 243 PC; 267/136, 154

[56] References Cited

U.S. PATENT DOCUMENTS

| 2,487,934 | 11/1949 | Mastropole | 64/1 V X |
| 2,734,359 | 2/1956 | Mulheim et al. | 64/27 B X |
| 3,667,214 | 6/1972 | Addie | 64/27 B X |
| 3,913,662 | 10/1975 | Davis | 165/8 |
| 3,991,818 | 11/1976 | Wagner | 165/8 |

Primary Examiner—Albert W. Davis, Jr.
Attorney, Agent, or Firm—J. C. Evans

[57] ABSTRACT

A regenerator assembly for a gas turbine engine includes a center driven rotatable matrix with a hub and drive shaft including a sprocket fixedly secured thereto with a roller chain driven thereacross by means of a cross shaft assembly including a first elongated tubular coupling telescoped with respect to a low rate torsion spring bar and wherein an input shaft connected to one end of the torsion spring bar is associated with damper means including first and second relatively movable parts connected in parallel to the torsion spring bar by the coupling and operative to damp oscillations in said matrix disc drive shaft during operation of the regenerator assembly.

4 Claims, 5 Drawing Figures

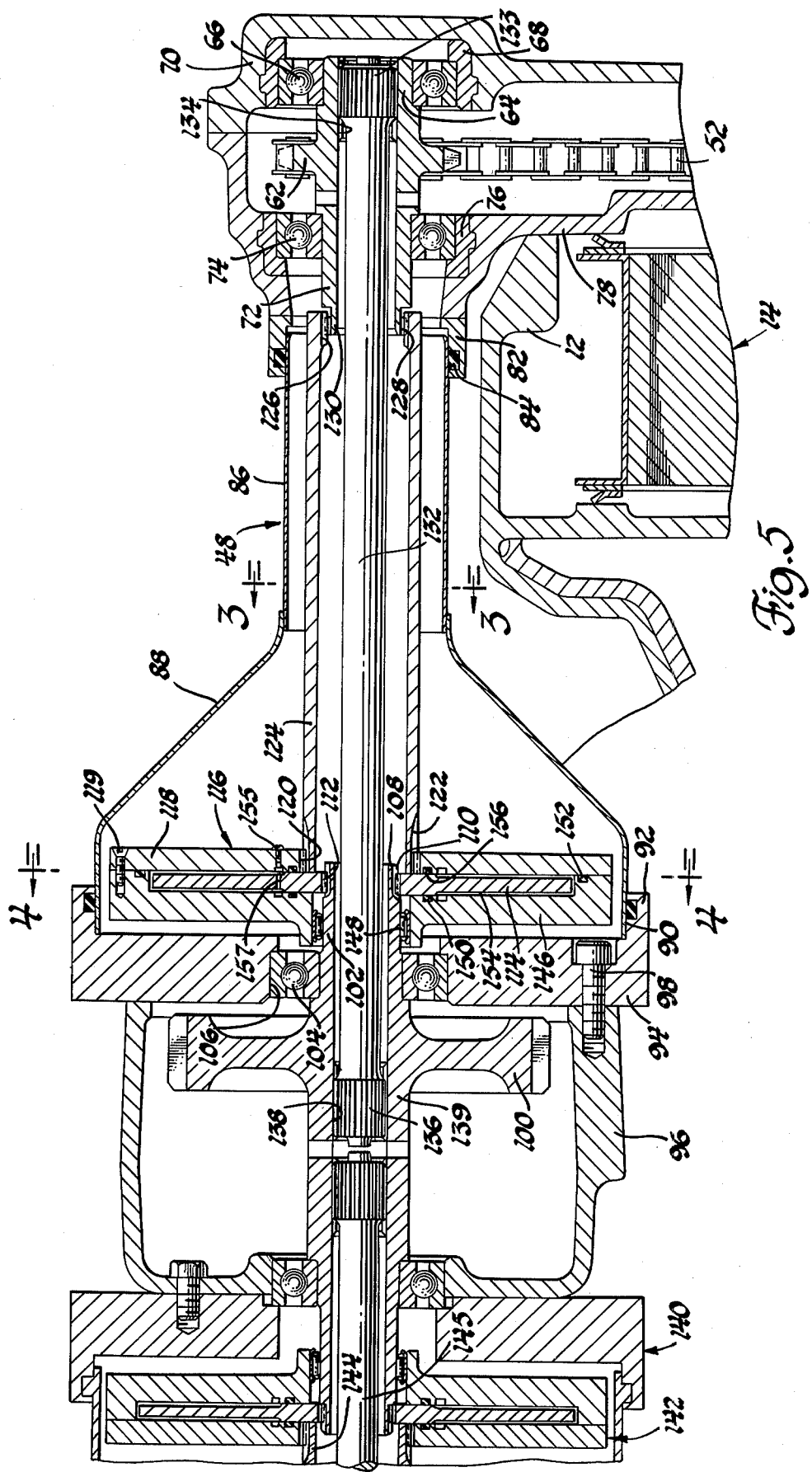

REGENERATOR DRIVE ASSEMBLY

In regenerator assemblies of the type having a rotatable matrix disc with a regenerator seal assembly biased against the face of the matrix disc oscillations at an input shaft to the regenerator disc can be transmitted to an associated cross-shaft drive assembly during operation of the gas turbine engine.

Because of the high temperature at which such a regenerator must operate when employed with gas turbines, the provision of an adequate durable matrix structure and seal structure cooperating therewith require care in material selection as well as selection of seal pressure. It has now been discovered that these problems are further aggravated by torsional oscillation or vibration of the regenerator matrix disc.

For example, torsional vibration of the regenerator matrix disc occurs because it is excited by the negative sloped friction characteristic of the regenerator seal material. This vibration takes place at the natural torsional frequency of the regenerator matrix disc and its drive train. Torque oscillation in such prior art devices can be so great as to result in broken drive train parts. In such systems, the regenerator disc is the mass and the drive train is the spring of a typical spring-mass system. In the case of a chain and sprocketed drive shaft train, the springs of the system are the drive shafts and chain, the chain predominating.

It should be realized that a typical regenerator of the type used with a gas turbine engine may have a regenerator matrix disc that is about two feet in overall diameter and about three inches thick in the axial direction. Such systems desirably must have excessive torque oscillations damped by means which can be connected in the matrix drive train.

One regenerator drive assembly with a damper unit included therein is disclosed in my U.S. Pat. No. 3,913,662 issued Oct. 21, 1975.

An object of the present invention is to improve a damper assembly for use in regenerator drive units and for use in other applications wherein a friction or otherwise included torsional vibration is established between input and output elements by the provision of an easily assembled cross shaft assembly having an elongated tubular coupling telescoped on an elongated torsion spring bar and having a damper unit with first and second movable parts connected respectively between the coupling and torsion spring bar components in parallel with the torsion bar and wherein one end of the torsion bar is connected to an input element and the other end of the torsion bar is connected to an output element to transfer drive torque therebetween and wherein the telescoped tubular coupling drives the damper unit when the torsion spring bar is flexed by induced vibrations therein to damp out torsional oscillations between the input and output elements.

Still another object of the present invention is to provide an improved regenerator drive assembly including a rotatable matrix disc having a central drive hub connected thereto with a drive shaft extending therefrom having a sprocket fixedly secured thereto driven by a roller chain element and a cross shaft assembly including a driven sprocket connected to one end of a torsion spring bar having its opposite end connected to an input component and wherein the driven sprocket is further connected to an elongated outer tubular coupling telescoped over the torsion spring bar and connected at one end thereof to one movable component of a viscous damper assembly which has a second movable component connected to an input drive to the cross shaft assembly and wherein the telescoped torsion spring bar is flexed in response to torsional oscillations between the input drive and the input shaft to the regenerator matrix disc and the damper assembly is operative to damp the torsional oscillations therebetween.

Further objects and advantages of the present invention will be apparent from the following description, reference being had to the accompanying drawings wherein a preferred embodiment of the present invention is clearly shown.

FIG. 5 is an enlarged, fragmentary cross sectional view of a cross shaft assembly in the present invention.

Figure 1:
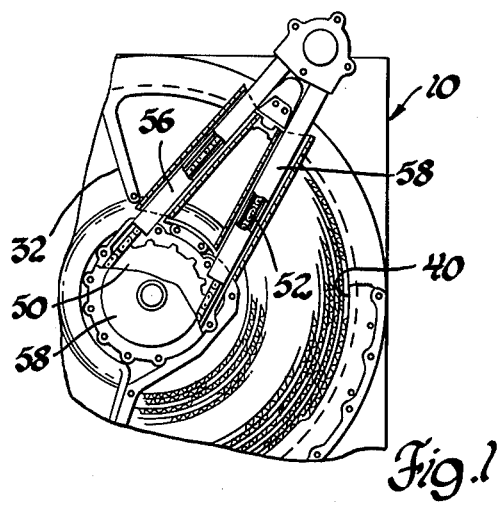
FIG. 1 is a view in end elevation of a regenerator assembly including the regenerator drive system of the present invention.
Figure 3:
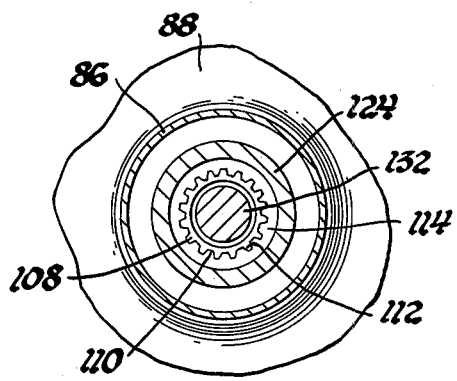
FIG. 3 is a vertical cross sectional view taken along line 3—3 of FIG. 5.
Figure 2:
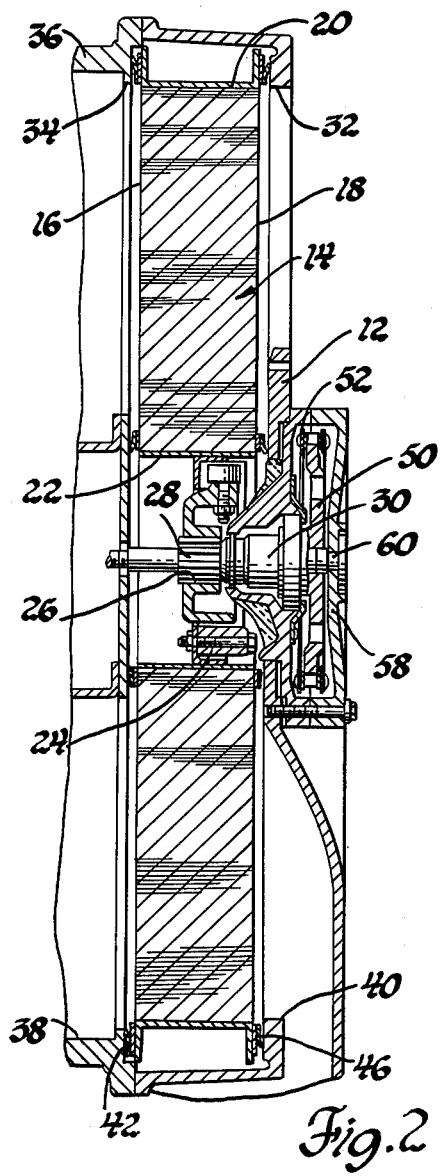
FIG. 2 is a schematic view of a rotary regenerator heat exchanger apparatus taken in a plane containing the axis of rotation of the matrix disc therein for purposes of illustrating the input drive thereto.
Figure 4:
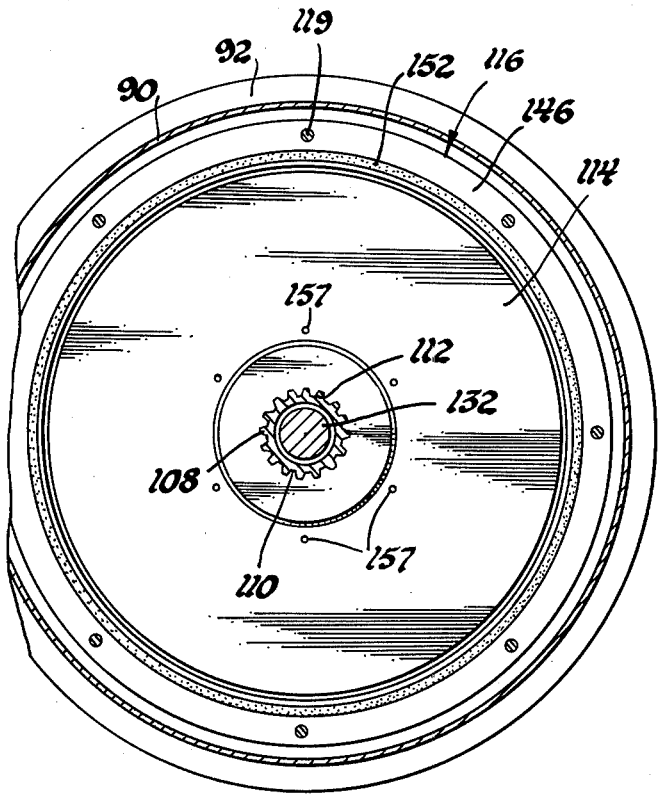
FIG. 4 is a vertical cross sectional view taken along line 4—4 of FIG. 5.

Referring first to FIGS. 1 and 2, a rotary regenerator heat exchanger apparatus 10 is illustrated of the type included in gas turbine engines having axial flow of inlet air thereto and axial exhaust of air therefrom. The apparatus includes a housing cover 12 generally drum shaped to enclose an annular, foraminous disc or matrix 14 which is fabricated to define a large plurality of pores or passages extending from an inner face 16 of the matrix 14 to an outer face 18 thereof.

The matrix 14 further includes an outer rim 20 and an inner rim 22. The matrix is rotated about an axis defined by a locating and drive hub 24 connected to the matrix 14, for example by being secured to the inner rim 22 thereof. The hub 24 includes a splined, centrally located bore 26 therein which receives outer diameter splines 28 on an input shaft 30.

An inlet 32 for high pressure inlet air enters one face of the housing 12 and, opposite to it, an outlet 34 is defined in an opposite cover 36 of the housing 12 for the discharge of compressed air which is heated as it is passed through the rotatable, disc configured matrix 14. Hot, low pressure exhaust gases enter the matrix 14 through an inlet 38 in cover 36 and leave the regenerator assembly 10 through an outlet 40 in cover 12. The two extremes of gas passing through the matrix 14 are in a counterflow relationship in the embodiment of the illustrated regenerator heat exchanger apparatus 10.

As shown, the hot exhaust gas outlet 40 is of a larger area than the cool air inlet 32 because of the difference in densities of the cool versus the heated fluid passing through the matrix 14.

In the illustrated arrangement of the invention, seal assemblies 42, 46 are located at the inner and outer faces 16, 18 of the disc or matrix 14 to confine the cold and hot fluids to the desired flow path through the matrix 18 and to minimize leakage between the aforesaid paths.

Referring now to the subject matter of the present invention, the drive shaft 30 is connected to an improved cross shaft assembly 48 by means of a sprocket 50 fixedly connected to the outboard end of the shaft 30. A driven roller chain 52 passes over the sprocket 50 and is encased within a housing cover including spaced arms 56, 58 as best shown in FIG. 1. Likewise the sprocket 50 is enclosed by a cover 58 which has an extension 60 of the shaft 30 journaled therein.

The roller chain 52 passes over a small diameter sprocket 62 in the cross shaft drive assembly 48. More particularly the sprocket 62, which represents the output from the cross shaft assembly 48, includes a tubular outboard end 64 rotatably supported by the inner race of a roller bearing 66 within a bearing housing 68 press fit within an end plate 70.

The sprocket 62 further includes an inboard extension 72 rotatably supported by the inner race of a roller bearing 74 seated in a bearing housing 76 that is press fit within an inboard sprocket housing 78 extending across one end of the gas turbine engine block at the top thereof. An annular adaptor member 82 is secured to the bearing housing 78 and includes an annular O-ring seal 84 therein. Seal 84 engages one end of a cross shaft housing 86 having its opposite end connected to a small diameter end of a conically configured housing portion 88 of the cross shaft drive assembly 48. It has an open end 90 thereon press fit with respect to an axial annular flange 92 on an end plate 94 that is secured to an input drive cover 96 by means of a plurality of fasteners shown as screw elements 98. The input drive cover 96 encloses a worm driven gear 100 having a tubular extension 102 supported by the inner race of a roller bearing 104 mounted within a central bore 106 through the plate 94. The tubular extension 102 includes an end 108 having outer diameter splines 110 thereon in engagement with internal splines 112 formed through a plate or disc 114 in a viscous damper assembly 116 which is disposed axially inboard of the plate 94 in spaced relationship therewith.

More particularly the damper assembly 116 includes a cover 118 secured thereon by screws 119. Cover 118 has a central opening therein with internal splines 120 in engagement with external splines 122 on one end of an elongated tubular coupling 124 having an opposite open end thereon with internal splines 126 in engagement with external splines 128 on the inboard end 130 of the tubular extension 72 from the sprocket 62. Thus the tubular coupling 124 is connected at one end thereof to the sprocket 62 at the opposite end to one movable component of the damper assembly 116.

A torsion spring bar 132 is telescoped through the outer tubular coupling 124. Bar 132 includes a splined outboard end 133 in engagement with internal splines 134 formed within the tubular end 64 of the sprocket 62. Bar 132 has an opposite splined end 136 engaged with internal splines 138 on an extension 139 of the worm driven gear 100.

The torsion spring bar 132 is thus aligned coaxially of the outer tubular coupling 124 and likewise is connected between the sprocket 62 and to the worm driven input gear 100 to be flexed in response to torsional oscillations therebetween.

In the illustrated arrangement a dual unit is illustrated including a right hand cross shaft assembly 140, as viewed in FIG. 5, which includes a damper assembly 142 an outer tubular coupling 144 and an inner torsion spring bar 145 all arranged identically to counter-part components within the cross shaft assembly 48 to couple the input gear 100 a driven disc or matrix on the opposite side of the regenerator assembly.

Each of the damper assemblies 116, 142 is connected in parallel with the inner torsion spring bars 132, 145. Each of them further include a cupped housing member 146 secured by screws 119 to cover 118. Member 146 includes an axially directed outboard extension 147 supported by means of a needle bearing assembly 148 on the O.D. of extension 102 for free relative rotation with respect thereto.

The housing 146 includes a pair of O-ring seals 150, 152 engaged with cover 118 and disc 114, respectively, to seal a chamber 154 filled with a suitable viscous fluid, such as silicone oil through fill ports 155. Disc 114 is ported at 157 to assist fill. Likewise the cover 118 includes an O-ring seal 156 that engages an opposite face of disc 114 to seal chamber 154. The thickness of disc 114 is such that a predetermined clearance exists on opposite sides thereof between cover 118 and housing 146.

In accordance with certain principles of the present invention, when vibration takes place in the matrix disc 14 and the drive train, torque oscillations as great as plus or minus 100% of steady state conditions can be experienced that can result in broken drive train parts. In the illustrated arrangement the disc or matrix 14 can be a mass in the order of 60 pounds and the drive train itself constitutes a spring of a typical spring-mass system. The illustrated cross shaft assembly 48 inserts another spring in series with those of the drive chain components and the like. The torsion spring bar 132 constitutes a spring in series with a drive train component. It has a lower rate than the drive train and transfers drive torque.

The bar 132 also is flexed by any friction induced vibration which is imposed thereon from the sprocket 62 as produced by negative slope friction characteristics as are produced between the regenerator seal assemblies 42, 44 and the disc 14. Tubular coupling 124 joins the sprocket 62 to the movable outer cover 118 and housing 146 and the viscous damper assembly 116 thereby is connected in parallel to bar 132. The internal plate 114 of the damper assembly 116 will move with respect to the cover 118 and housing 146 and shear the viscous fluid to produce a positive damping torque on the bar 132 in response to torsional take up in the torsion spring bar 132 thereby to damp torsional oscillations between the gear 100 and the sprocket 62. This damps disc 14 so that the entire drive train is relieved of resultant oscillatory stresses and consequent fatigue.

While the configuration is illustrated in a cross shaft assembly, for a regenerator drive assembly it should be understood that the combination input drive and output drive with a torsion spring bar 132 therebetween along with a damper assembly 116 in parallel therewith coupled to one of the ends of the drive system by means of a coaxially arranged telescoped outer tubular coupling is suitable for use in any drive train where torsional vibrations are either friction induced or result from a forced function imposed thereon. Examples of friction induced vibration which can be compensated by means of the present invention include systems wherein tool chatter is directed back to a tool holder; a system wherein a braking component is subjected to squeal which can be transmitted back to a grounded component in the system and to damp clutch chatter in a power transfer system.

In some of these systems, friction induced vibration is of a stick-slip type, rather than a sinusoidal type induced vibration as experienced in the regenerator disc 16 running with respect to the illustrated seal assemblies. Stick-slip type induced vibrations can be smoothed but not eliminated as in the case of the sinusoidal type of induced vibrations.

While the embodiments of the present invention, as herein disclosed, constitute a preferred form, it is to be understood that other forms might be adopted.

The embodiments of the invention in which an exclusive property or privilege is claimed are defined as follows:

1. A drive and damper assembly comprising a drive housing, a double ended tubular output sprocket, a dual bearing support for said sprocket including a first bearing rotatably journaled at one end of said housing supporting one end of said output sprocket and a second bearing axially spaced from said first bearing and journaled in said housing to support the other end of said sprocket, a first elongated tubular coupling connected to the output sprocket at the other end thereof and having an opposite end thereon, a torsion spring bar directed coaxially through said tubular coupling and having one end thereof fixedly connected against relative rotation to said output sprocket radially inboard of said first bearing and having an opposite end thereon, a tubular input shaft, a third bearing rotatably journaled within said housing for supporting said input shaft, said input shaft telescoped over and having an internal spline connected to the opposite end of said torsion spring bar, damper means including first and second relatively movable parts, one of said movable parts connected to the opposite end of said first tubular coupling, said input shaft having an external spline thereon connected to the other of said movable parts and a radial bearing surface telescoped inside said one movable part said first and second movable parts of said damper means having viscous fluid interposed therebetween and being operative in response to differential motion between the input shaft and the output sprocket to produce a positive damping torque on said spring bar, said first and second movable parts of said damper means being installed in parallel with said torsion spring bar with said spring bar transferring drive torque from the input shaft to the output sprocket and also being flexed in response to induced vibration to produce a differential motion required for damper means operation, said one movable part having an axial extension overlying said radial bearing surface, and needle bearing means to smoothly rotatably support said extension on said bearing surface and to prevent axial tilt of said damper means with respect to said spring bar thereby to maintain uniform damping torque.

2. A drive and damper assembly comprising a drive housing, an output sprocket rotatably journaled at one end of said housing, a first elongated tubular coupling connected to the output sprocket at one end thereof and having an opposite end thereon, a torsion spring bar directed coaxially through said tubular coupling and having one end thereof fixedly connected against relative rotation to said output sprocket and having an opposite end thereon, an input shaft rotatably journaled within said housing and connected coaxially of and to the opposite end of said torsion spring bar, damper means including first and second relatively movable parts, one of said movable parts connected to the opposite end of said first tubular coupling, connection means for connecting the other of said movable parts to the opposite end of said torsion spring bar, said first and second movable parts of said damper means having viscous fluid interposed therebetween and being operative in response to differential motion between the input shaft and the output sprocket to produce a positive damping torque on said bar, said first and second movable parts of said damper means being installed in parallel with said torsion spring bar with said spring bar transferring drive torque from the input shaft to the output sprocket and also being flexed in response to induced vibration to produce a differential motion required for damper means operation, said input shaft being tubular and telescoped over said bar, said connection means including an outer diameter splined segment on said input shaft and an inner diameter splined segment thereon, connected to said other of said movable parts and said torsion spring bar respectively, said one of said movable parts including a cover and a cupped member with the cover being connected to said first tubular coupling, said cupped member having an axially directed outboard extension telescoped over said input shaft and needle bearing means for rotatably supporting said cupped member on said input shaft and to prevent axial tilt therebetween thereby to maintain uniform damping torque.

3. In a rotary regenerator assembly for use in gas turbine engines and having a matrix disc and regenerator seal with a friction characteristic therebetween that excites torsional vibration in the disc the combination of a matrix disc hub drive shaft having a sprocket fixedly secured to one end thereof, means for driving said sprocket including a driven roller chain and a cross shaft drive assembly, said cross shaft drive assembly including a housing, an output sprocket rotatably journaled at one end of said housing and connected to the roller chain, an elongated tubular coupling connected to the output sprocket at one end thereof and having an opposite end thereon, a torsion spring bar directed coaxially through said outer tubular coupling and having one end thereof connected to said output sprocket and having an opposite end thereon, an input shaft rotatably journaled within said housing and connected coaxially of and to the opposite end of said torsion spring bar, damper means including first and second relatively movable parts one of said movable parts connected to the opposite end of said tubular coupling and the other of said movable parts connected to the opposite end of said torsion spring bar, said first and second movable parts of said damper means having viscous fluid interposed therebetween and being operative in response to differential motion between the input shaft and the output sprocket to produce a positive damping torque to oppose matrix disc oscillations produced by friction between the rotary matrix disc and the regenerator seal, said first and second parts of said damper means being installed in parallel with said torsion spring bar with said spring bar transferring drive torque from the input shaft to the matrix disc shaft and also being flexed in response to friction induced vibration to produce a differential motion required for damper means operation.

4. In a rotary regenerator assembly for use in gas turbine engines and having a matrix disc and regenerator seal with a friction characteristic therebetween that excites torsional vibration in the disc the combination of a matrix disc hub drive shaft having a sprocket fixedly secured to one end thereof, means for driving said sprocket including a driven roller chain and a cross shaft drive assembly, said cross shaft drive assembly including a housing, an output sprocket rotatably journaled at one end of said housing and connected to the roller chain, an elongated tubular coupling connected to the output sprocket at one end thereof and having an opposite end thereon, a torsion spring bar directed coaxially through said outer tubular coupling and having one end thereof connected to said output sprocket and having an opposite end thereon, an input shaft rotatably journaled within said housing and connected coaxially of and to the opposite end of said torsion spring bar, damper means including first and second relatively movable parts one of said movable parts connected to the opposite end of said tubular coupling and the other of said movable parts connected to the opposite end of said torsion spring bar, said first and second movable parts of said damper means having viscous fluid interposed therebetween and being operative in response to differential motion between the input shaft and the output sprocket to produce a positive damping torque to oppose matrix disc oscillations produced by friction between the rotary matrix disc and the regenerator seal, said first and second parts of said damper means being installed in parallel with said torsion spring bar with said spring bar transferring drive torque from the input shaft to the matrix disc shaft and also being flexed in response to friction induced vibration to produce a differential motion required for damper means operation, said input shaft being tubular and telescoped over said bar, said connection means including an outer diameter splined segment on said input shaft and an inner diameter splined segment thereon, connected to said other of said movable parts and said torsion spring bar respectively, said one of said movable parts including a cover and a housing with the cover being connected to said first tubular coupling, and means for rotatably supporting said housing on said input shaft.

* * * * *